April 9, 1940. C. F. BACHLE 2,196,285
FLUID FLOW MEASURING DEVICE
Filed Nov. 21, 1936

INVENTOR
Carl F. Bachle

Patented Apr. 9, 1940

2,196,285

UNITED STATES PATENT OFFICE 2,196,285

FLUID FLOW MEASURING DEVICE

Carl F. Bachle, Grosse Pointe Park, Mich.

Application November 21, 1936, Serial No. 112,051

7 Claims. (Cl. 73—203)

This invention relates to a fuel consumption measuring device and more particularly pertains to a device for measuring the fuel consumption in a motor vehicle by means of a novel type of flowmeter.

An object of my present invention is to provide an improved device of the character described by incorporating sensitive means whereby the instrument may directly indicate the consumption in miles per gallon or any other specific measure of volume, thereby avoiding the necessity of calculations which are ordinarily necessary when the fuel flow and the speed are known and specific consumption is desired.

More particularly, the object of my invention is to provide an improved flowmeter wherein liquid flows upwardly thru a transparent tube of substantially constant diameter, and in which a disc, herein called a floater, fits the tube with a small clearance thru which fluid flows, a chain being fastened to the under side of the floater so as to be free to raise from a pile at the bottom of the tube as the floater rises. When the floater has been lifted only a short distance by the liquid flowing through the tube the pressure drop across the floater is small; however, when the floater has been lifted to a higher position, the liquid flow must be increased. This may be demonstrated by consideration of the ordinary flow formula:

(1) $$Q = AC\sqrt{2gh}$$

Where $Q$=Liquid flow, volume.
$A$=Area of opening.
$C$=Orifice coefficient, or ratio of effective area to actual area.
$g$=Acceleration due to gravity.
$h$=Presure drop across area, A.

In the case herein considered, A, C, and $g$ are constants; therefore, the flow depends only on the value of $h$ and since $h$ is variable by reason of the variable weight of the chain, it follows that the flow Q, is proportional to the square root of the pressure differential, $h$ across the floater. Introducing expressions for the weight of the chain lifted by the floater, the flow formula is:

(2) $$Q = AC\sqrt{2g\frac{w_f + w_c L}{A_f \delta}}$$

where $w_f$=effective weight of the floater
$w_c$=effective weight of chain per unit length
$L$=length of chain
$\delta$=density of liquid flowing
$A_f$=area of floater disc.

Figure 1:
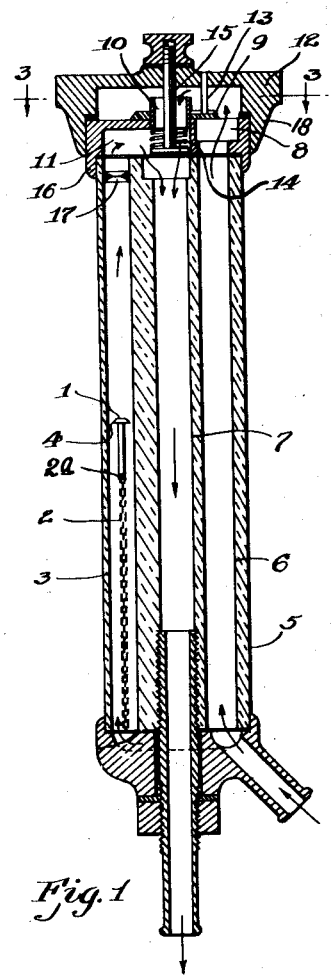
Figure 2:
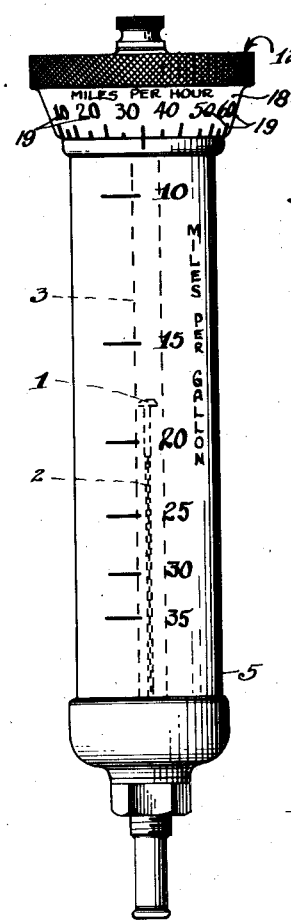
Figure 3:
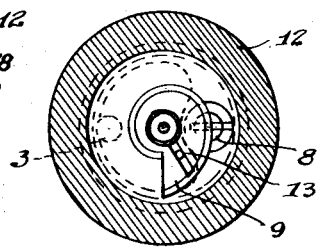
Figure 7:
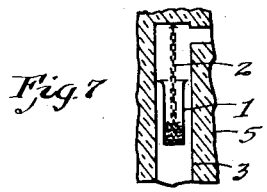
Figure 4:
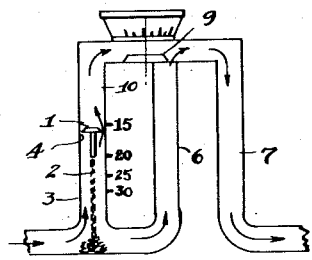
Figure 6:
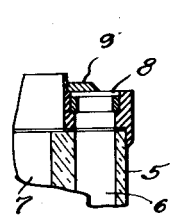
Figure 5:
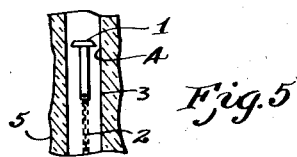

For a more detailed understanding of my invention, reference may be had to the accompanying drawing which illustrates one form which my invention may assume, and in which:

Fig. 1 is a sectional elevation of the instrument showing all the main parts and the path of the fluid thru the instrument, Fig. 2 is a front elevation of the instrument showing the scales and the chain and floater, Fig. 3 is a section taken through the plane 3—3 of Fig. 1, showing the disc by-pass valve and slot which it covers and uncovers, Fig. 4 is a diagrammatical view of the instrument showing the path of the fluid thru the instrument, Fig. 5 is a detailed view of the floater, Fig. 6 is a detailed view of the by-pass disc valve, and Fig. 7 is an alternative construction of the chain and floater where the chain is suspended at the top and the floater forms a cup for the piled chain as it rises.

Referring to the drawing, 1 is a disc or floater which has a chain 2 attached to its underside as at 2a. The floater is actually of greater specific gravity than the liquid, but is called floater for convenience. The floater 1 fits the tube 3 with some clearance so that liquid may pass thru the annular opening 4 formed by the clearance around the disc or floater 1. The tube 3 is formed by boring in the transparent body 5 as are the other passages 6 and 7. Passage 6 forms a bypass around the tube 3 so that fuel flows upward in both tubes 3 and 6. The fluid in the by-pass tube 6 flows thru a slot 8 which is partially covered by the disc 9. This fluid then flows down the passage 10 and into the chamber 11, where it joins the fluid from the tube 3 and flows downward thru tube 7, and thence to the engine of the vehicle.

Preferably said disc 9 is adjustable to vary the effective opening of slot 8 in the following manner. The disc 9 is connected to the cover 12 by a pin 13 so that the cover 12 and disc 9 move together. The cover is held in place by the spring 14, and rod 15, but loosely enough so that the cover 12, may be moved angularly relative to the part 16.

In Fig. 3 the disc 9 is seen to have a variable radius, so that as it is rotated clockwise, more of the slot 8 is uncovered, thus giving a greater by-pass area. 17 is a restriction to provide flow characteristics.

The restriction 9 is adjustable while the instrument is in operation. The position of this valve is indicated by a knob 18 having figures 19 engraved on it which represent miles per hour. At different vehicle speeds the position of the by-pass valve is adjusted so that the speed as read on the speedometer is the same as the reading on the knob. In effect this makes the flowmeter range variable to accommodate various vehicle speeds. It is apparent that any flowmeter could be calibrated in miles per gallon. All that would be required would be to substitute for the gallons per hour figures other figures which are obtained by dividing the speed for which calibration is described by gallons per hour values, on the flowmeter scale. Thus, if a flowmeter was to be adapted to read miles per gallon directly, and the speed for which calibration was desired was 30 miles per hour, a point on the flowmeter scale which read 3 gallons per hour would be changed to 30/3 or 10 miles per gallon. Each point would be similarly changed. My invention is essentially such a device with additional provisions for quickly and easily changing the range of the instrument by the use of the aforementioned valve in the by-pass part of the instrument. After calibrating the instrument to read miles per gallon directly for one speed it is necessary that the same marks on the miles per gallon scale hold true for other speeds. To make this possible it is necessary that for any position of the by-pass valve the ratio of fluid flow at any two points on the miles per gallon scale be the same at any position of the by-pass valve. I have provided special means for insuring that this feature is incorporated in the instrument.

In the flow Equation 2 the flow is seen to depend on the value of A C. When the by-pass valve is opened the effect is to increase the value of A C. However, with the value of A C fixed, as it would be at any given setting of the by-pass valve, the ratio of flow of any two points on the scale is seen to depend only on the square root of the length L of the chain 2. From this it can be seen that the ratio of fuel flow at any two points on the flowmeter scale will remain the same for any position of the by-pass, thus permitting one set of calibration marks on the miles per gallon scale to indicate the vehicle consumption for all vehicle speeds.

The foregoing is true only if the orifice coefficient, C, for the annulus orifice formed by the floater and tube and the orifice coefficient of the orifice formed at the by-pass valve have the same characteristics of variation with changes in flow rate. These two orifice coefficients have been made to agree within limits by providing sharp edges at both orifices. Further provisions for this purpose have been provided by a sharp-edged restriction 17 in the same passage as the chain and floater move in, as shown in Fig. 1.

It will be apparent to those skilled in the art to which my invention pertains, that various modifications and changes may be made therein without departing from the spirit of my invention, or from the scope of the appended claims.

What I claim as my invention is:

1. In a metering device for measuring fluid flow and comprising a structure having internal fluid passages and inlet and outlet ports, one of said passages positioned substantially vertical and arranged for fluid flow therethrough against the force of gravity, a member operable in said vertical passage in response to fluid flow therethrough and having a clearance relative to the wall of said vertical passage, means operable in response to gravitational forces and acting on said member to resist the movement of said member in said vertical passage in response to fluid flow therethrough, said means automatically adjusted to vary the resistance force proportionally to fluid flow, said vertical passage having a restricted outlet opening, another of said passages being a by-pass around said vertical passage, and an adjustable valve at the outlet orifice of said by-pass passage, and a manually actuated indicator graduated in miles per hour and operatively connected with said adjustable valve, said member moved proportionally to fluid flow and indicating quantity of fluid flow corresponding to said miles per hour reading.

2. A fluid metering device including a body having inlet and outlet ports, said body having a plurality of passages connecting said ports in parallel, one of said passages having a substantially vertically disposed portion of substantially uniform cross-sectional area throughout, a restricting member movably operable in said vertically disposed passage portion and having such dimensions as to provide an orifice for fluid flow between said member and the wall of said passage portion, weighted means operatively cooperating with said restricting member to variably resist vertical movement thereof, another of said passages having an adjustable valve therein, said valve providing an orifice having substantially the same effective orifice coefficient as said first mentioned orifice, manual adjusting means connected with said valve and including an indicator graduated in miles per hour, and an indicator associated with said restricting member and graduated in miles per unit of fluid measure.

3. A fluid metering device including a body having inlet and outlet ports, said body having a plurality of passages connecting said ports in parallel, one of said passages having a substantially vertically disposed portion of substantially uniform cross-sectional area throughout, a restricting member movably operable in said vertically disposed passage portion and having such dimensions as to provide an orifice for fluid flow between said member and the wall of said passage portion, the said passage provided with a stationary restricting member providing an orifice, weighted means operatively cooperating with said movable restricting member to variably resist vertical movement thereof, another of said passages having an adjustable valve therein, said valve providing an orifice having substantially the same effective orifice coefficient as said first mentioned orifice, manual adjusting means connected with said valve and including an indicator graduated in miles per hour, and an indicator associated with said restricting member and graduated in miles per unit of fluid measure.

4. A fluid metering device including a body having inlet and outlet ports, said body having a plurality of passages connecting said ports in parallel, one of said passages having a substantially vertically disposed portion of substantially uniform cross-sectional area throughout, a restricting member movably operable in said vertically disposed passage portion and having such dimensions as to provide an orifice for fluid flow between said member and the wall of said passage portion, weight means comprising a chain operatively cooperating with said movable restricting member to variably resist vertical movement thereof, another of said passages having an adjustable valve therein, said valve providing an orifice having substantially the same effective orifice coefficient as said first mentioned orifice, manual adjusting means connected with said valve and including an indicator graduated in miles per hour, and an indicator associated with said restricting member and graduated in miles per unit of fluid measure.

5. A fluid metering device for a motor propelled structure including a body having inlet and outlet ports and a plurality of internal fluid conducting passages connected in parallel relation with said inlet and outlet ports, means associated with one of said passages and operable in response to fluid flow therethrough, another of said fluid conducting passages constructed and arranged as a by-pass passage around said first mentioned passage and provided with an outlet, an adjustable valve at said outlet, an adjustable indicator graduated in units of linear measure per unit of time and operatively connected with said adjustable valve, and an indicator means associated with the first mentioned passage and graduated in units of linear measure per unit of fluid measure, said adjustable indicator adjusted accordingly to the speed of the motor propelled structure whereby to indicate quantity of fluid flow on said indicator means in units of linear measure per units of fluid measure corresponding to the speed of said motor propelled structure.

6. A fluid metering device for a motor propelled vehicle including a body structure having inlet and outlet ports and a plurality of internal fluid conducting passages connected in parallel relation with said inlet and outlet ports, fluid quantity flow indicating means associated with one of said passages and operable in response to fluid flow therethrough, another of said fluid conducting passages constructed and arranged as a by-pass passage around said first mentioned passage and provided with an outlet, and adjustable valve at said outlet, a manually adjusted indicator graduated in miles per hour and operatively connected with the adjustable valve controlling said by-pass outlet, indicator means associated with said first passage and graduated in miles per unit of fluid measure, said adjustable indicator operable to adjust the adjustable valve by manually adjusting the aforesaid adjustable indicator in accordance with observed vehicle speed in miles per hour, whereby the indicator associated with said first passage will indicate in miles per unit fluid measure in accordance with the speed in miles per hour of said vehicle.

7. In a metering device for measuring fluid flow and comprising a structure connected in the fuel line of a vehicle propelled by an internal combustion engine having internal fluid passages and inlet and outlet ports, one of said passages having a uniform cross-sectional area throughout its length and positioned substantially vertical and arranged for fluid flow therethrough against the force of gravity, a member operable in said vertical passage in response to fluid flow therethrough and having a clearance relative to the wall of said vertical passage, means operable in response to gravitational forces and acting on said member to resist the movement of said member in said vertical passage in response to fluid flow therethrough, said other passage providing a by-pass passage for said fluid flow and having an outlet orifice, said means automatically adjusted to vary the resistance force proportionally to fluid flow, said first mentioned passage having a restricted outlet opening, and an adjustable valve at the outlet orifice of said by-pass passage, said valve being adjusted in accordance with the speed of the vehicle, and indicating means associated with said device for indicating miles per gallon.

CARL F. BACHLE.